US007212955B2

(12) United States Patent  
Kirshenbaum et al.

(10) Patent No.: US 7,212,955 B2
(45) Date of Patent: May 1, 2007

(54) CONSUMER PRODUCT STATUS MONITORING (75) Inventors: Evan Kirshenbaum, Mountain View, CA (US); Henri Jacques Suermondt, Sunnyvale, CA (US); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 10/757,232

(22) Filed: Jan. 14, 2004

(65) Prior Publication Data
US 2004/0148117 A1 Jul. 29, 2004

Related U.S. Application Data (63) Continuation-in-part of application No. 09/931,479, filed on Aug. 16, 2001, now abandoned.

(51) Int. Cl.
G01D 9/00 (2006.01)

(52) U.S. Cl. .......................... 702/187; 702/81; 702/82; 346/20; 340/540

(58) Field of Classification Search ............... 702/187, 702/1, 22–25, 130, 81–84, 132, 136, 140, 702/141, 179, 188, 181; 235/375–377, 384, 235/385, 462.01; 346/20, 33 R; 99/467, 99/468; 62/60, 125, 127, 129; 206/305, 206/306, 459.1; 340/673, 674, 540, 529, 340/500, 501, 572.1, 585, 588, 3.42, 3.7, 340/693.5
See application file for complete search history.

(56) References Cited

U.S. PATENT DOCUMENTS

| 4,114,450 | A | * | 9/1978 | Shulman et al. ............... 73/489 |
| 4,663,725 | A | | 5/1987 | Truckenbrod et al. ...... 700/276 |
| 5,117,096 | A | | 5/1992 | Bauer et al. ................. 235/375 |
| 5,424,720 | A | * | 6/1995 | Kirkpatrick .................. 340/585 |
| 5,798,694 | A | | 8/1998 | Reber et al. ................. 340/540 |
| 5,867,809 | A | * | 2/1999 | Soga et al. .................. 702/130 |
| 5,946,919 | A | * | 9/1999 | McKinney et al. ........... 62/3.7 |
| 6,009,400 | A | * | 12/1999 | Blackman ....................... 705/1 |
| 6,158,381 | A | * | 12/2000 | Bray ........................... 116/216 |
| 6,185,513 | B1 | | 2/2001 | Plettner et al. ............. 702/187 |
| 6,275,779 | B1 | | 8/2001 | Pohle et al. ................. 702/130 |
| 6,741,523 | B1 | * | 5/2004 | Bommarito et al. ........ 368/327 |
| 2002/0113606 | A1 | | 8/2002 | Hansen et al. .............. 324/689 |
| 2002/0161545 | A1 | * | 10/2002 | Starling et al. ............. 702/130 |
| 2004/0100380 | A1 | * | 5/2004 | Lindsay et al. ............. 340/540 |

OTHER PUBLICATIONS

On the Cutting Edge, Sep. 2003, Kiplinger's, pp. 21-22, no authorship attributed.

* cited by examiner

Primary Examiner—Hal Wachsman (57) ABSTRACT

Data associated with at least one characteristic associated with the viability of a product is monitored. The data associated with the at least one characteristic is analyzed, and based on the analyzing, at least one future viability state condition of the product is predicted. At least one indicator is displayed related to the at least one future viability state condition.

26 Claims, 10 Drawing Sheets

CONSUMER PRODUCT STATUS MONITORING

This application is a continuation-in-part of U.S. patent application Ser. No. 09/931,479, filed Aug. 16, 2001, now abandoned.

BACKGROUND

1. Field

The application relates generally to packaging and, more particularly, to sensing and displaying product information associated with estimating a critical date, or dates, for a product having a predictable life expectancy or maturity.

2. Description of Related Art

Numerous consumer products are sensitive to time, environment, and handling. The notion of critical date(s) for an item relates to anything of importance and consequence happening to the product itself, defining or altering usage consideration. As general examples; a comestible may be no longer pleasing or safe to eat, or may have an expected maturity time-frame, namely, becoming ready for optimal consumption; an item having a limited life-span may no longer be potent enough to be effective; or the like. As some specific examples: wine is best kept a constant moderate temperature and oriented horizontally; meat and some dairy products need substantially constant refrigeration; fruits and vegetables are subject to both environmental storage conditions from the time of harvest—namely, temperature and humidity—and damage by rough handling ("G-loads"); photographic film can be affected by radiation and temperature and humidity changes; batteries have a limited shelf life; and the like.

Generally, products having such sensitivities are sometimes labeled regarding a specific factor relevant to a decision to purchase the individual item. For example, some products are date-stamp packaged so that the consumer can determine freshness. However, most manufacturers or suppliers are very conservative in their estimates, assuming some average degree of mishandling and perishability into these type of product warning calculations. Thus, this date-stamp labeling is an error-prone test for current product condition and also can lead to waste when a safe product is summarily discarded as expired. Some products bear handling instructions, which the consumer can only presume that the shipper has followed.

For the main part, consumers now use a combination of imprecise proxy measures to draw conclusions about a product. They can inspect the packaging for damage; they can try to detect signs of product decay, e.g., odor; they can notice current condition, e.g., refrigerated; they can take into account the reputation of the retailer, shipper, and suppliers. However, none of these measures give any accurate information about the actual previous handling of the product since it has left its point of origin.

Some products are re-inspectible and re-certifiable as to current condition; e.g., fire extinguishers which have a charge (pressure) gauge; some batteries are packaged with a "tester" to determine if they are still charged. These mechanisms provides a slightly better indicator for the consumer as to current condition. However, there are few, if any, labels providing dynamically generated historical data which would be of interest to the consumer; e.g., "what is the travel history of this wine?" In other words, in these current condition mechanisms there is no record visible to the consumer that the product has been handled appropriately in transit from the producer to the present time, perishability and probable expiration.

There is a need for a system including a sensing apparatus with display capability which provides the history of at least one measurable factor associated with a specific product that affects the characteristics of that product. The apparatus should have a data display which assures the consumer that a packaged product has been handled appropriately according to certain measurable parameters over its life since the package was sealed. The apparatus should help enhance consumer satisfaction and safety. The apparatus should give consumers accurate and detailed information about the previous handling of the product, about the current status of the product, and about any predicted critical date(s). The apparatus may even provide a "conclusion" about the status of the product; e.g., current safety for consumption, use, or the like.

BRIEF SUMMARY

The described exemplary embodiments generally relate to product monitoring and, more specifically, to dynamic critical time-related characteristics for products having a life span which is sensitive to the passage of time, environmental conditions, handling, or any combination thereof.

The foregoing summary is not intended to be an inclusive list of all the aspects, objects, advantages and features of the present invention nor should any limitation on the scope of the invention be implied therefrom. Other objects, features and advantages of the present invention will become apparent upon consideration of the following explanation and the accompanying drawings, in which like reference designations represent like features throughout the drawings.

BRIEF DESCRIPTION OF THE DRAWINGS

The drawings referred to in this specification should be understood as not being drawn to scale except if specifically annotated.

DETAILED DESCRIPTION

Figure 1:
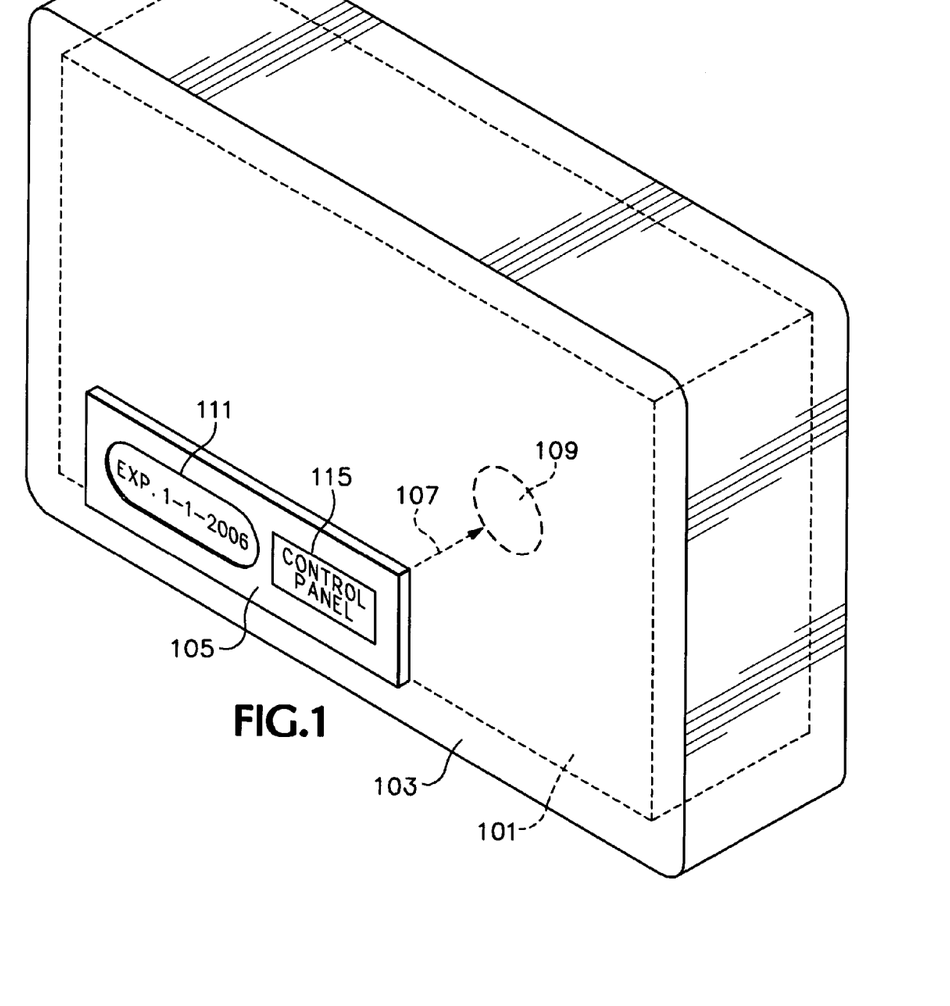
FIG. 1 is a schematic, generic illustration of an exemplary embodiment of the present invention associated with a consumer product.

Turning to FIG. 1, a generic product 101, which has at least one characteristic that changes over time, is illustrated as being sealed in a shipping package 103. For the purpose of explaining the exemplary embodiments of the invention, assume that the product is an edible product which is affected if the environmental conditions are not maintained within a specified range, that may be damaged by improper handling, and that has a product life—such as a predictable expiration in approximately a month, e.g., an expensive, fresh packed (versus canned) caviar, but whose expiration will be shortened in a predictable manner should the optimal environmental conditions not be maintained—or a projected maturity time—a wine which will properly age in the bottle if kept under proper conditions for 5 years. A monitor 105 is affixed, preferably in a tamper proof manner, to the package 103. The monitor 105 apparatus includes a sensor probe 107 for measuring temperature affixed, preferably, (represented by connection 109) to the edible product 101 itself.

Figure 1A:
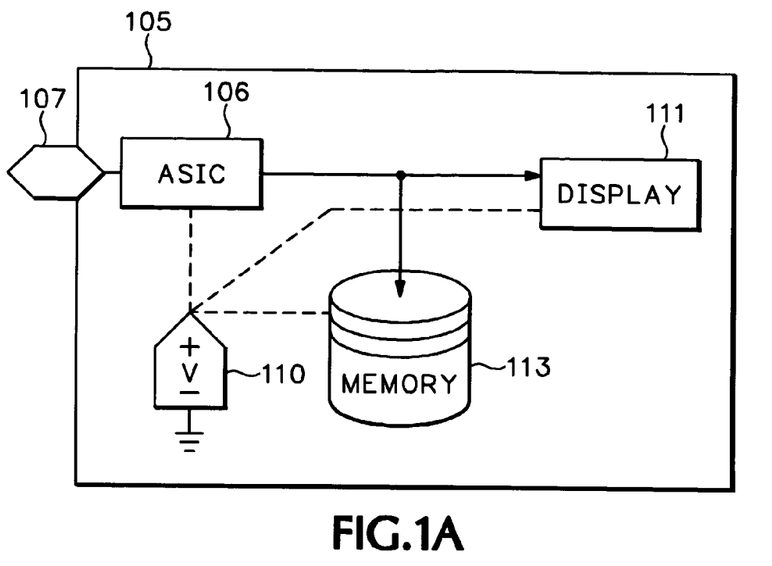
FIG. 1A is a schematic block diagram for the basic apparatus of an exemplary embodiment of the present invention as shown in FIG. 1.

As shown in FIG. 1A, in addition to the probe 107, the monitor 105 apparatus also may include electronic circuitry 106 for processing data from the probe—e.g., an application specific integrated circuit ("ASIC")—a memory 113, and a display 111. The monitor may include a power supply such as a battery, solar cell, or the like, 110 appropriately connected as needed for any specific electronics package implementation.

In a given implementation, the display 111 may show a predicted critical date, such as the date after which the product should no longer be consumed. This prediction might be made based on, for example, a history of temperature measurements. Should the temperature at the product remain outside of an optimal range for a significant period of time, the predicted remaining viability—that is, the time between present and the predicted expiration date—will be correspondingly shortened, wherein the amount of shortening is sensitive to the amount of time and the degree of temperature deviation. Therefore, the display 111 may be configured to show a history of the characteristic over time; in this case, shown in FIG. 4 as a plot of temperature ("° F.") versus time ("t"), where time runs from the origin when the package 103 was sealed, assumably under the supplier's closely maintained packaging conditions, to the present time. While some consumers may be interested in this more complete history of a product, in a simple implementation, the display 111 can be a "GOOD/BAD" indicator. That is, in the present example, based on the historical record in memory, if during the thirty day product life a temperature excursion outside the specified range for a significant predetermined period of time occurs, the indicator display 111 flips from "GOOD" to "BAD" ("SPOILED," "DISCARD," or the like) warning against consuming the edible(s)101 contained in the package 103.

For more complex data monitoring, processing, and display, controls 115 may be included as part of the monitor 105 apparatus; e.g., for scrolling data on a dynamic display 111 such as a liquid crystal display (LCD) screen, displaying different sets of recorded data, and the like. In some embodiments, a finer degree of time granularity may be employed. In such embodiments, "critical date" may instead be "critical hour," "critical minute," or the like. Such embodiments may be applicable to prepared food which must be served or sold within a short, but environmentally-dependent, amount of time after being prepared, or items being cooked or refrigerated-until-set, where the required cooking or refrigeration time depends on precise temperature control of the chamber or item and the history of temperature over the requisite time period.

To summarize, a consumer product 101 may be fitted with a monitor 105 that measures one or more parameters that are relevant to the appropriate handling of the product. These measurements may be of the product itself or may be of the surrounding environment, e.g., ambient temperature, pressure, and humidity. The history of these measurements may be recorded by the monitor 105 apparatus; the record may be via a direct display device or may be in a data form such that dynamic periodic updating of a separate display may be made with all measurements, a set of recent measurements, or important measurements (high, low, median or average).

The monitor 105 apparatus may be provided with the ability of deriving a conclusion about the likely handling or status of the consumer product ("SAFE" or "UNSAFE") based on the historical data for display to the consumer. A most practical implementation for analysis and conclusion is to provide a dynamically alterable critical date. To extend the foregoing example, if the caviar was refrigerated at the low end of the predetermined proper storage temperature range for the entire thirty days, the expiration date might be extended for a week or until the package temperature raised out of the range.

The sensor 107 measurements can be continuous or according to a periodic sampling based upon the nature of the characteristic being monitored. The measurement history can be displayed as a set of time-stamped alpha-numeric figures or symbols or in graphical form or as a discrete set of possible conclusions about the handling history.

Figure 2:
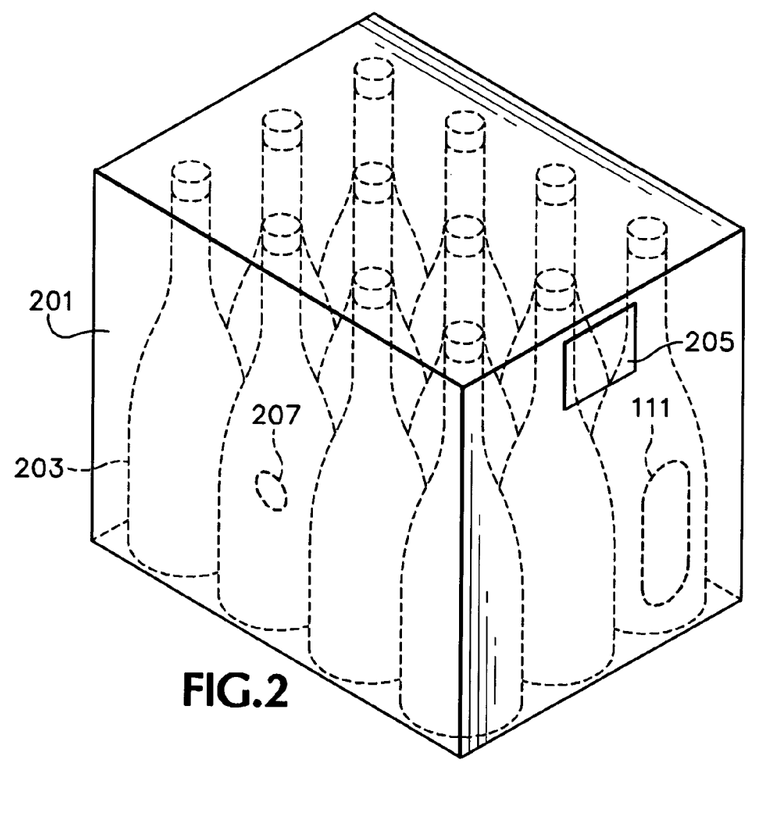
FIG. 2 is an alternative exemplary embodiment of the present invention.

FIG. 2 illustrates an exemplary embodiment where the handling and environmental history conditions of a shipping container having a plurality of separately sealed product units is involved; e.g., a case 201 (of the re-usable wooden type known in the art) of bottled wine 203. In this embodiment, the actual measurement of a critical parameter, e.g., ambient temperature, may be performed by a sensor 205 that is external to the consumer products, viz., the wine in the bottles, itself. Ambient temperature can optionally be shown on a monitor display (see e.g., FIGS. 1, 1A, element 111) on the case 201. Note however that for such implementations the data may and preferably should also be transmitted (wired or wireless) to each salable unit 203, viz., transmitted to individual displays 111 on each bottle in the event the case is broken up at retailer distribution. Note also that the reverse configuration of monitor apparatus also can be implemented, providing a sensor that is in intimate contact with the product (e.g., a transmitting, pH detector 207 molded into the glass each bottle 203) transmitting data to a single display (e.g., a strip chart for each bottle on one screen or printout).

Figure 3:
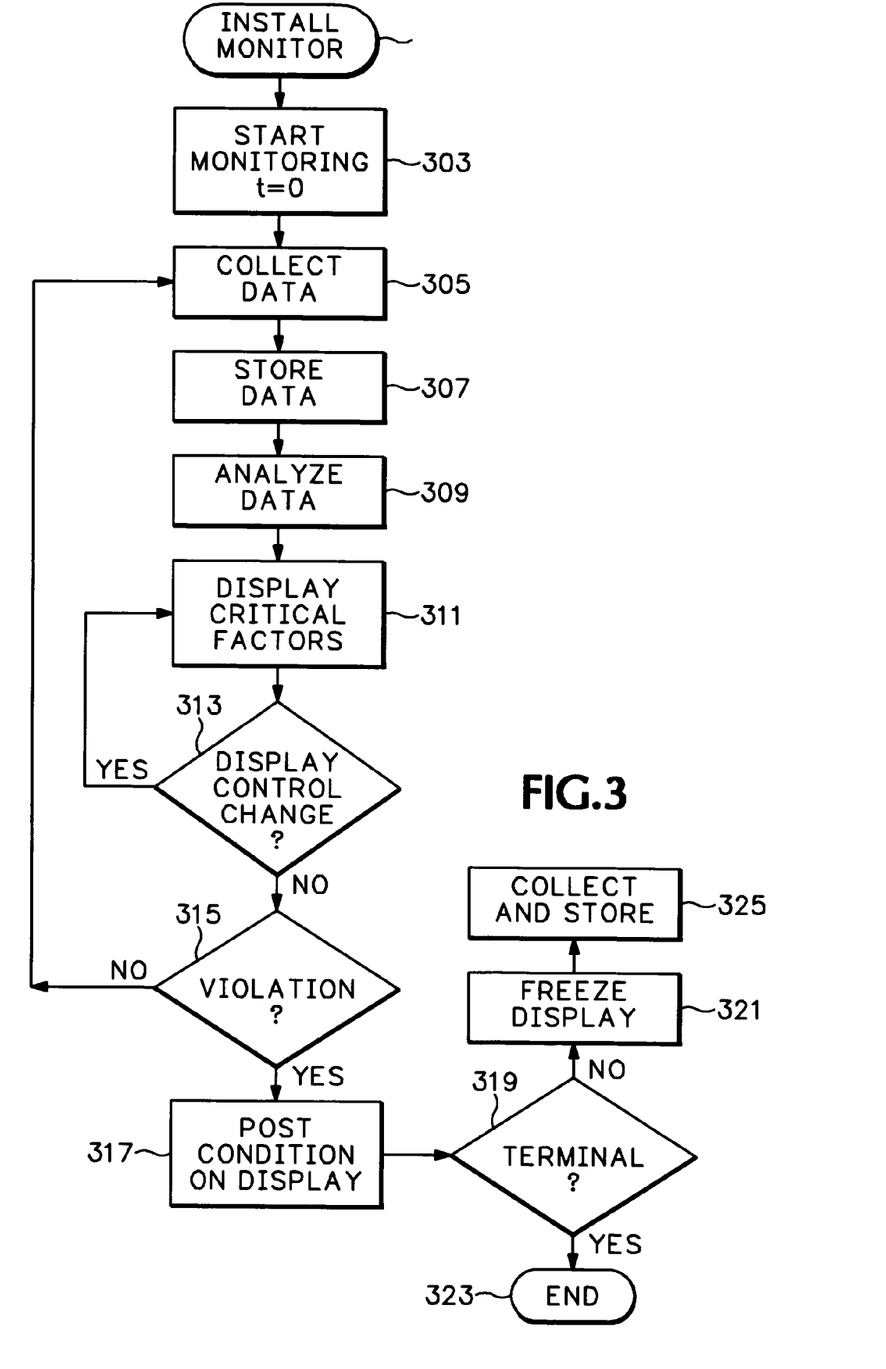
FIG. 3 is a flow chart for operation of an exemplary embodiment in accordance with the exemplary embodiment of the present invention as shown in FIG. 1.

FIG. 3 is a flowchart of an exemplary operation of the present invention wherein a unified system of data monitoring, storage and display is provided. The manufacturer or supplier installs the data collecting monitor at the time the product is sealed in its package. The monitoring of historical data for the parameter(s) of interest that are related to the specific product begins immediately, step 303. The data is collected (step 305) and stored on either a continuous or relevant sampling period basis, step 307. In the preferred embodiment, real time analysis of the data is provided, e.g., via ASIC 106), step 309. The data representative of criticality factors, e.g., a critical date related to expiration or maturity, that are generally associated with a decision regarding purchase or use of the product is displayed, step 311. In an embodiment where there are a plurality of parameters of interest to the consumer, display control is provided, step 313, allowing the user to change the current display, step 313, YES-path. The data can be associated with predetermined rules associated with the specific product. As long as a rule related to handling, storage conditions, perishability, and expiration of the product is not violated, data monitoring, storage, and storage continues, step 315, NO-path. If a rule is violated, step 315, YES-path, a warning or other symbolical representation of the violation is displayed, step 317. If the violation is terminal to use of the product, step 319, YES-path, the process ends, step 323, leaving the posted warning (step 317). If the violation is not terminal, step 319, NO-path, the display is nonetheless frozen with the warning of the violation, step 321, and the data collection and storage continues, step 325, for future data access and analysis.

Figure 4:
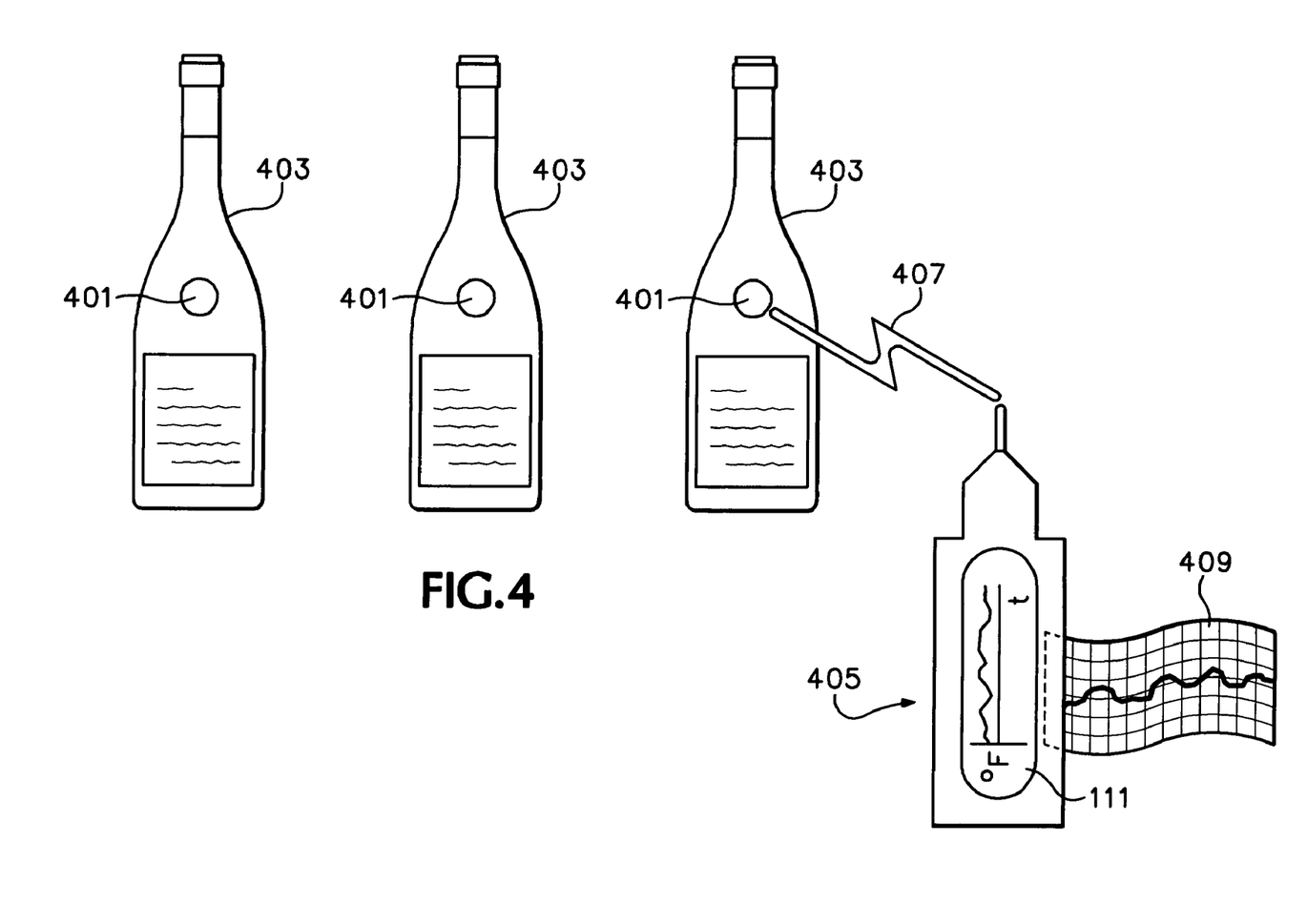
FIG. 4 is a schematic depiction of a uniform system for product monitoring implemented in accordance with an exemplary embodiment of the present invention.

FIG. 4 demonstrates an exemplary uniform system by which product viability data tracking and display can be implemented. Product characteristic sensor-transmitters 401 may be attachable to individual products 403 (e.g., bottles of wine) wherein a standard industry protocol is adopted for the data recording and subsequent transmission format. Then, a separate, portable, receiver-display 405 may be implemented wherein bringing the receiver-display into contact with a sensor-transmitter output port (wired transmission) or into proximity to a sensor-transmitter (wireless; illustrated by "lightening bolt" symbol 407) results in a display 111 or printout 409 (e.g., from an incorporated ink-jet plotter; not shown), or both, of the historical data, current condition of the product, and the like. Known manner, programmable controls (e.g., ASIC, or microprocessor, based with a LCD touch screen) can be provided (not shown, but see FIG. 1, element 105) as part of the receiver-display 405.

Note that while an individual sensing element (e.g. 107, 109 FIGS. 1 and 1A or 401 FIG. 4) might be mass produced relatively inexpensively, for example, a wine case monitor 105 or receiver-display 405 would be a relatively expensive apparatus. Therefore, a programmable reset function may be implemented in the monitor 105 or receiver-display 405. At the same time, to ensure accuracy in the data, the sensing element and its associated memory preferably should be essentially tamper proof.

Figure 5:
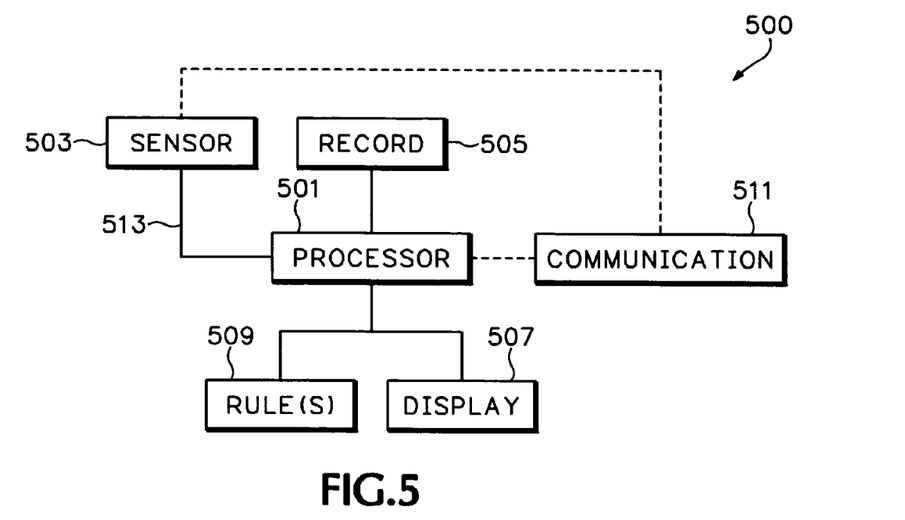
FIG. 5 is a system level schematic block diagram of an exemplary embodiment of the present invention.

FIG. 5 is a system level schematic block diagram of an exemplary embodiment of the present invention. In this exemplary embodiment, a system 500 is provided which can calculate and display a predicted critical date based on:
(1) an item's classification—e.g., a bottle of wine, a piece of fruit, a device subject to degradation over time such as a rubber windshield wiper blade, or the like, and
(2) a recorded history of conditions which may affect the monitored item, and
(3) a rule or rules related to expiration or degradation or maturity of each item, or both.

Figure 6:
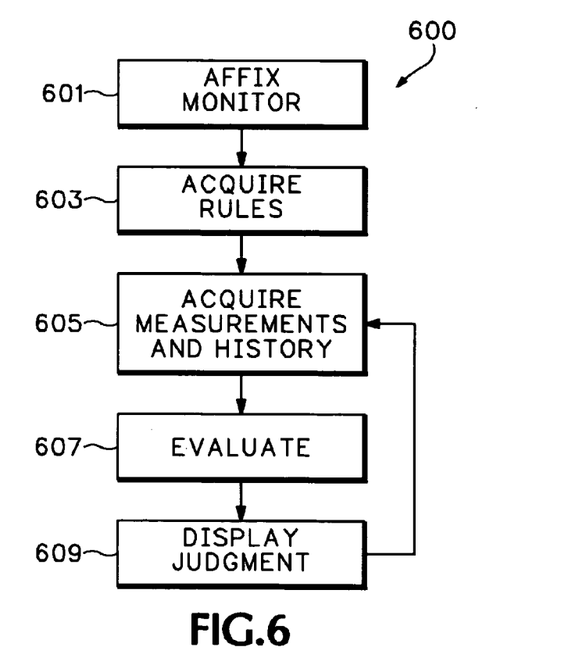
FIG. 6 is a basic exemplary embodiment of a method for employing the system 500 of FIG. 5 and determining an approximated expiration for a monitored item of interest.

While specific implementations may vary, fundamental components may include: a "Processor" 501, such as an ASIC or generally microprocessor with associated programming; a "Sensor" 503 for monitoring at least one specific condition associated with the degradation of an item whose viability changes over time; a "Record" 505, a data storage device for storing data related to viability; and a "Display" 507 for exhibiting an estimated critical date or time, along with, optionally, an indication of estimated current condition, historical information with respect to environmental measurements, or both, or similar data. When the predicted critical date is calculated according to the predetermined rule or rules established for the monitored item, a data set of the "Rule(s)" 509 are provided. These rules may be algorithms, heuristics, machine-learning evolving programs, neural networks, classifiers, or the like, stored in a memory and associated with the Processor 501 which will perform calculations based thereon. Additionally, the system 500 may include some telecommunications mechanism, "Communication" 511, associated with the Processor 501 when there is no direct link 513 between a remote Sensor, or monitor, 503 and the monitoring system 500 in order for the Processor 501 to receive input data from the Sensor 503, In any event, there is some mechanism associated with the monitored items for obtaining measurements pertinent to perishability, whether by a direct link or remote communications link, and some mechanism for using the measurements to calculate a time frame or a set of future dates related to product critical date(s), Turning also to FIG. 6, a basic exemplary embodiment of a method 600 for employing the system 500 of FIG. 5 and determining an approximate expiration for the monitored item is illustrated. Critical dates, or similar information, may be dynamic. As described hereinbefore in a variety of exemplary embodiments, a measurement mechanism is associated 601 with the monitored item. The measurements might be performed by a probe inserted into the monitored item itself, by a sensor attached to, or in close proximity to, the monitored item, by a sensor affixed to, or integrated within, a container—sealed or resealable—containing the monitored item, by a measurement device within the same environment as the monitored item, by a sensor affixed to, or integrated within, an environmental chamber such as a refrigerator, a humidor, a shipping container, a truck, or the like.

As described hereinbefore, depending on the nature of the monitored item, handling and changing environmental conditions associated with perishability affect critical date(s) prediction outcomes. With respect to environmental conditions, relevant factors might involve measurable characteristics such as temperature, temperature gradients, pressure, humidity, dynamic G-loads, impacts, the presence or absence of certain gasses in the local atmosphere or within a sealed container, or the like. For many comestible items, relevant factors with respect to the monitored item itself might involve things like temperature, viscosity, acidity, sugar content, bacterial content, solidity, color, or the like.

The mechanism for recording and storing history data of such relevant factors, Record 505, can be implemented in accordance with the state of the art for computerized memory and data storage. The history data may include recording the absence of data for times when the item is determined to be in an unmeasurable state; generally, and as will be described in more detail with respect to FIG. 12, where the Sensor 505 is within a resealable containment, it is recognized that a specific monitored item may be temporarily removed from its container. Note also that rules can be implemented for estimating factors during such out-of-measurement periods. The Rule(s) 509 may also be tailored to include estimates of a set of factors for pre-containment. Moreover, it is contemplated that the historical data Record 505 may include combinations of direct monitored item measurements and containment measurements for such factors. It is also contemplated that the Record 505 may include combinations of current measurement with forwarded historical data as a monitored item moves from one environment to another, e.g., deep freeze to refrigerated truck to store cooler to home refrigerator.

The Processor 501 acquires 603 appropriate Rule(s) 509. In essence, each rule is related to a factor relevant to and predictive of remaining life for the monitored item. Generally, this may involve determining some sort of classification for the monitored item. Classification may be generated directly such as by manual input, e.g., typed, speech recognition based on visual recognition or given identifier(s), or the like, barcode or magnetic stripe reading, optical character recognition, obtaining an output signal from a containment apparatus or a prior monitoring apparatus via a telecommunication transmission (e.g., RFID tags) or receiving and acknowledging a hard-coded rule, setting DIP switches, or the like as is known in the art. Once the class has been identified, one or more appropriate rules might be selected from a set of Rule(s) 509 on-board the system 500 or from a remote location, such as a website or other data repository, via the Communication 511 unit. Alternatively, a rule may be selected or entered directly, without identifying a class for the item, and passed from apparatus-to-apparatus along with the item.

The Processor 501 acquires 605 current Sensor 502 measurements, if any relevant data are being generated in real-time, and associated historical data, Record 505.

The appropriate rule or rules 509, are applied 607 to the current measurements, if any, and the recorded historical data, Record 505. Note that the analysis may take place on-board or at a remote system, e.g., a website. The latter may be advantageous if the entity which creates the rules wishes to maintain trade secret status therefor. The analysis may also be accomplished by the local system and a remote entity acting in concert in order to prevent disclosure of a full algorithmic process.

Figure 7:
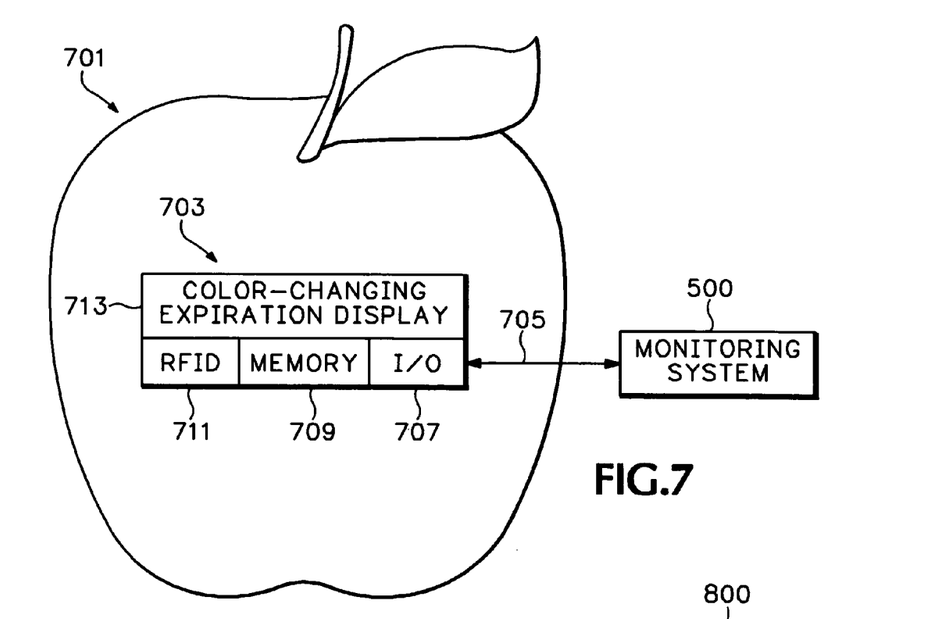
FIG. 7 is an illustration of an apple having a tag associated with a monitoring system.

The Display 507 may take a large variety of implementations. The Display 507 may be attached to the monitored item itself. FIG. 7 illustrates a typical item having relational viability factors, a comestible item, shown as an apple 701. An item tag device 703 is applied directly to the apple 701. The monitoring System 500 for this exemplary embodiment will include the Communication 511 unit with a remote link 705 to an Input-Output, "I/O," subunit 707 of the tag device 703. The I/O subunit 707 can be locally linked to a "Memory" 709, a Radio Frequency Identification ("RFID") unit 711, and a "Color-Changing Expiration Display" 713 of the tag device 703. Over time, apples rot; but long before rotten, they tend to soften and lose flavor. In this type of comestible example, the Display 713 simply may be a strip having color controlled by the System 500, e.g., changing from green as an indication for having a 1 week maturation period, to yellow for 1 day, to red for "now ripe" to black for "expired." Continuous spectrum indicators may be employed. Item tag embodiments may include tags that are either attached to the item having viability factors as shown or maintained proximate the monitored item being monitored, such as on a box in which the item is packaged by the manufacturer or distributor.

Figure 8:
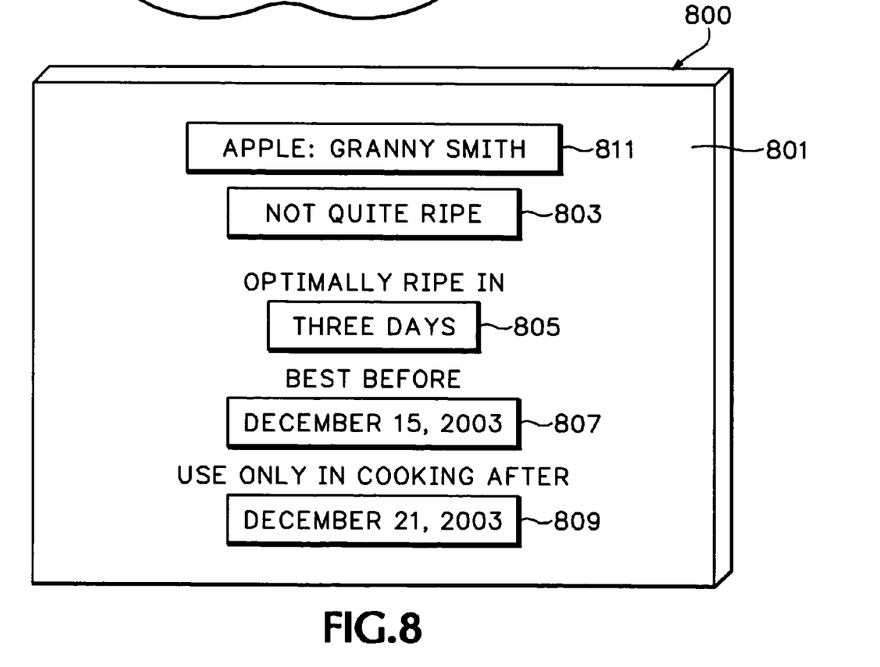
FIG. 8 is a depiction of an exemplary embodiment of a mechanism having a display showing several data points associated with the product and its perishability.
Figure 9:
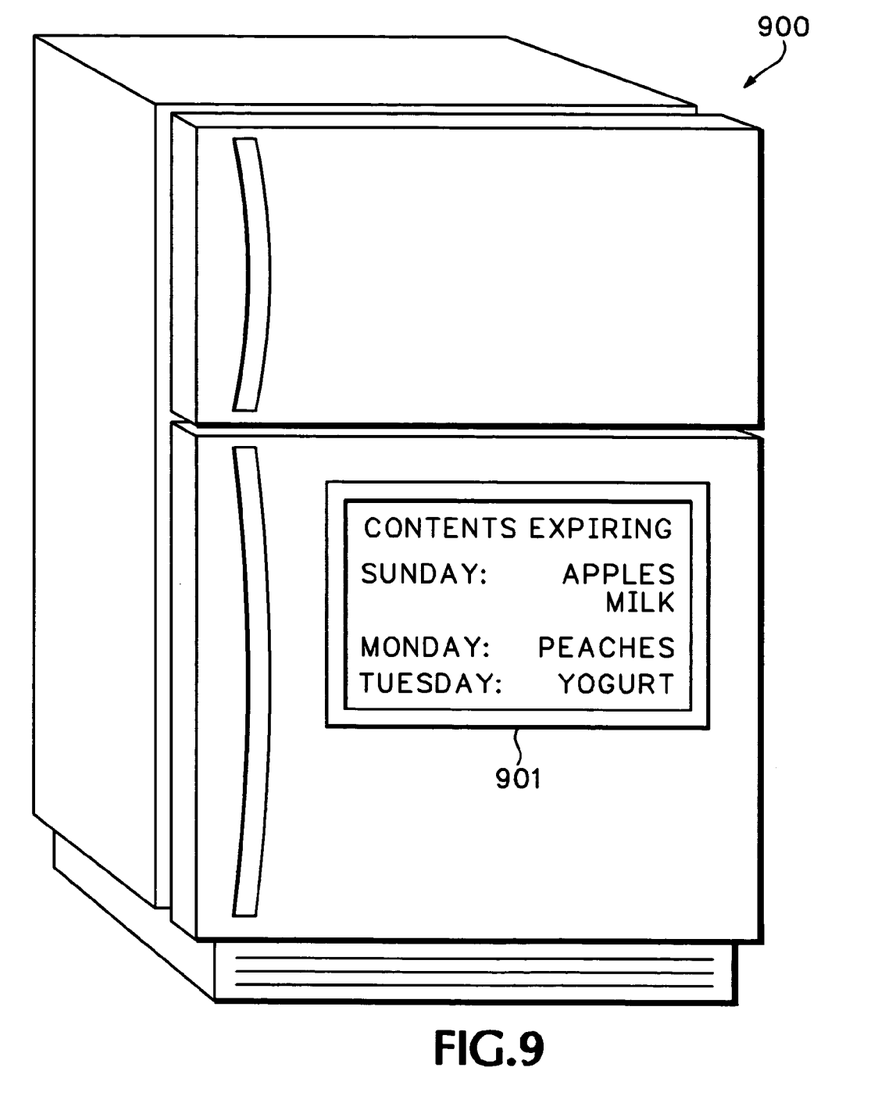
FIG. 9 is a depiction of a refrigerated unit having a display showing several data associated with perishability of contents.

FIG. 8 shows another mechanism 800, having a screen 801 for displaying critical date(s). The mechanism 800 would be similar to a bar code scanner apparatus. Continuing the example of FIG. 7, for an "Apple: Granny Smith" 701, the display 800 shows a current condition read-out 803, here e.g., "NOT QUITE RIPE." Fields 805, 807, 809 are included for predictions of a range of critical dates may be displayed, here e.g., display fields labeled "Optimally Ripe In," "Best Before," and "Use Only in Cooking After," wherein calculated dates are dynamically provided 609 (FIG. 6) from the above-described evaluation 607 based on acquired rules 603, acquired measurements, and history 605, or some combination thereof. Display field 811 shows the item type, "Apple: Granny Smith," allowing the user to verify the correct item has been scanned. In other words, the mechanism 800 is brought into proximity with the apple "I/O" 707. The fields 803–811 are filled with data based on the information received; e.g., the RFID 711 identifies the item type (note alternatively, known manner item identification such as bar coding, preset item identification, or the like, may be employed). This allows the scanner to determine the correct rule to use to process the time, environmental, and handling history data received from the tag 703. For example, there may be different critical dates for apples considered ripe for serving in a fruit bowl on a table and more ripe than desirable eating as is, but ripe for use in making juice or applesauce, and the apples can be moved to different store displays accordingly. The results of the rule application are displayed on the "Monitoring System" 500 display Another exemplary Display 507 is illustrated in FIG. 9. A refrigerator 900, or freezer, storage closet or pantry, wine cabinet and semi-sealed wine cellar, market display case, or the like, can be provided with a display panel 901. Here a set of most probable expirations for the contents of the refrigerator 900 are shown as a specific amount of time, here e.g., fixed days of the week related to specific contents. That is, there are several predictions, each using its own rule, and each predicting the remaining life when considered as suitable for a monitored item having a particuar function. The rules for such an apparatus may be generalized based upon hypothetical situations and conditions of the interior containment chamber(s) or may receive data from individual monitored items—see e.g., FIG. 7—or smaller containers therein (see e.g., FIGS. 1 and 2). Such a centralized display for predicted critical date(s) of a variety of monitored item contents is useful further in that the user does not have to breach the containment—thereby affecting environmental conditions therein—to get monitored item contents' associated expiration data. In such containment type monitoring systems, it may be advantageous to provide the capability of transmitting monitored item history to a subsequently used containment, e.g., a wine-cellar monitor might transmit data to a shipping container monitor.

In an alternative embodiment, the data collection (e.g., step 305, FIG. 3) device(s) (e.g. 105–109, FIG. 1) may be integrated with a resealable container (e.g., element 103 as a plastic tub with a removable lid, a zipper-type plastic bag, or the like as would be known in the art), either with a display (e.g., 111) or attachable in a known manner (e.g., via cable and plug-jack) to a permanent display associated with a refrigerator (or other environmental control chamber, e.g., a humidor). The resealable container may be either disposable or, if the data collection device is provided with a reset function, reusable. The product is placed in the container and the data collection device initiated (e.g., step 303). For example, leftover food is put in the container, sealed, data collection initiated via the controls 115 appropriately to conditions of interest (basically "freshness" factors). The display then provides real time data, estimate of remaining life, or a warning indicator (e.g., "STALE/DISCARD"), when certain changes are monitored. Note again, that the parameters for monitoring might be fixed in accordance with the type of box such as in FIG. 2; e.g., a fruit shipping box may have a fixed program for monitoring parameters associated with the particular fruit type. Based on a specific implementation the data collection device (with or without integrated display) can be provided with a known manner mechanism for attaching the device to the product container.

Figure 10:
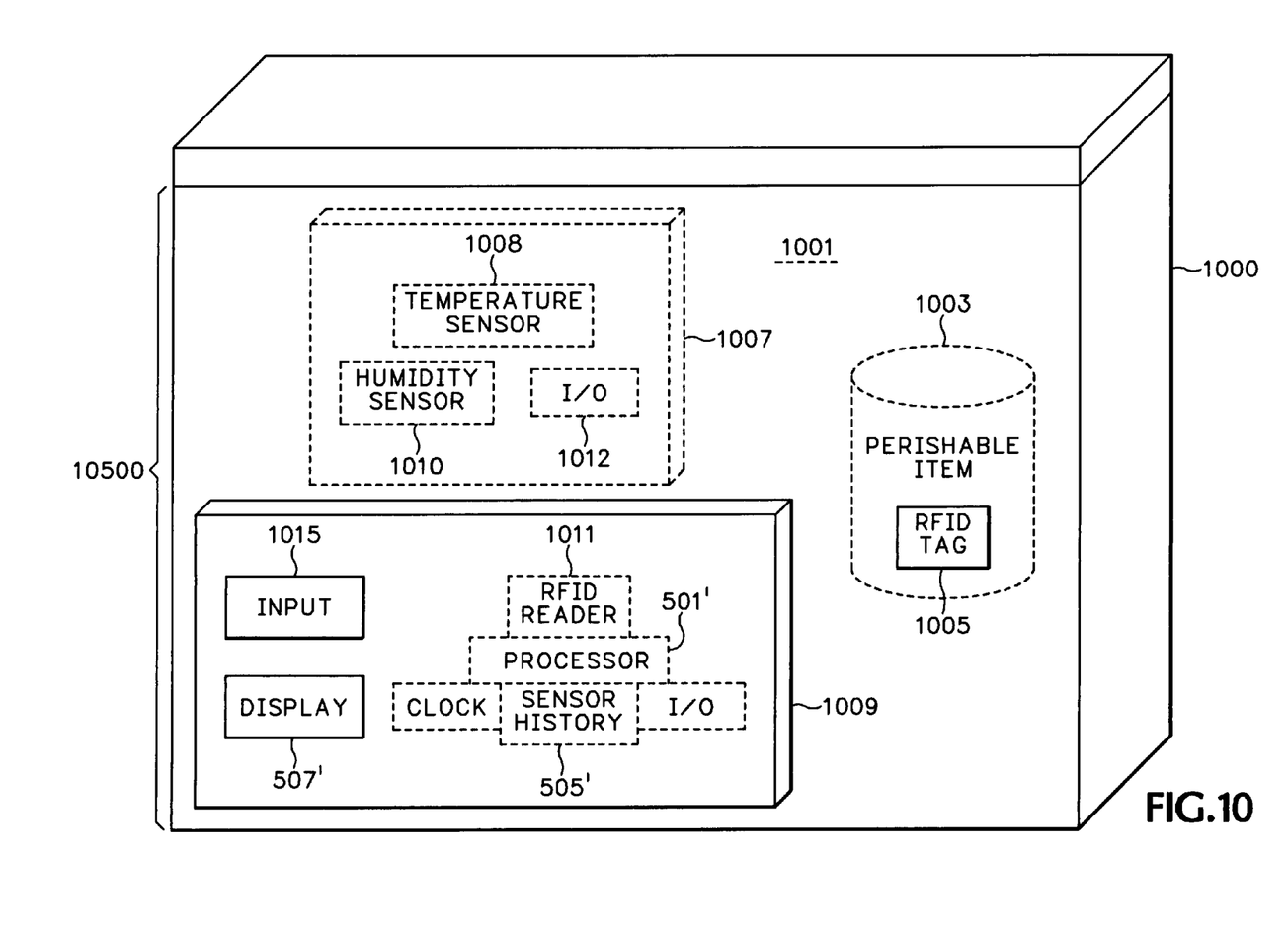
FIG. 10 is a perspective view illustration of a portable container exemplary embodiment of the present invention.

FIG. 10 illustrates an exemplary embodiment for a resealable shipping container 1000, having a containment chamber 1001, wherein the container may be equipped with a monitoring system 10500 (see also FIG. 5, 500) for keeping track of the history Record 505 for the "Perishable Item" 1003 generally kept therein. As described hereinbefore, the Rule(s) 509 and rendered judgments 607, 609 (FIG. 6) with respect to life expectancy, degradation, expiration, maturation, remaining potency, or the like critical date(s), preferably should compensate for time periods so-contained perishable items spend outside the containment chamber 1001. The Perishable Item 1003 may provided with a known manner RFID Tag 1005 for communicating with the monitoring system 10500. An internal environmental monitor 1007 (analogus to Sensor 503, FIG. 5) may be held within the chamber 1001; the environmental monitor may include individual devices such as a Temperature Sensor 1008, a Humidity Sensor 1010, and the like, depending on the monitored item contents historical data of interest. An I/O port device 1012 may be provided for communicating the data outside of the chamber 1001. A perishability evaluation unit 1009, which may be affixed to, or detachably mounted on, the container 1000 may include subunits associated with the monitoring system 10500 in substantially the same manner as described with respect to FIG. 5, including a historical data record "Sensor History" 505', a "Display" 507', and a "Processor" 501'. In this exemplary embodiment, an "RFID Reader" 1011 is included for communicating with the RFID Tag 1005. A "Clock" 1013 and an "Input" panel 1015 (see also, FIG. 1, 115) may also be provided in appropriate association with the Processor 501' as would be known to persons skilled in the art.

Figure 11:
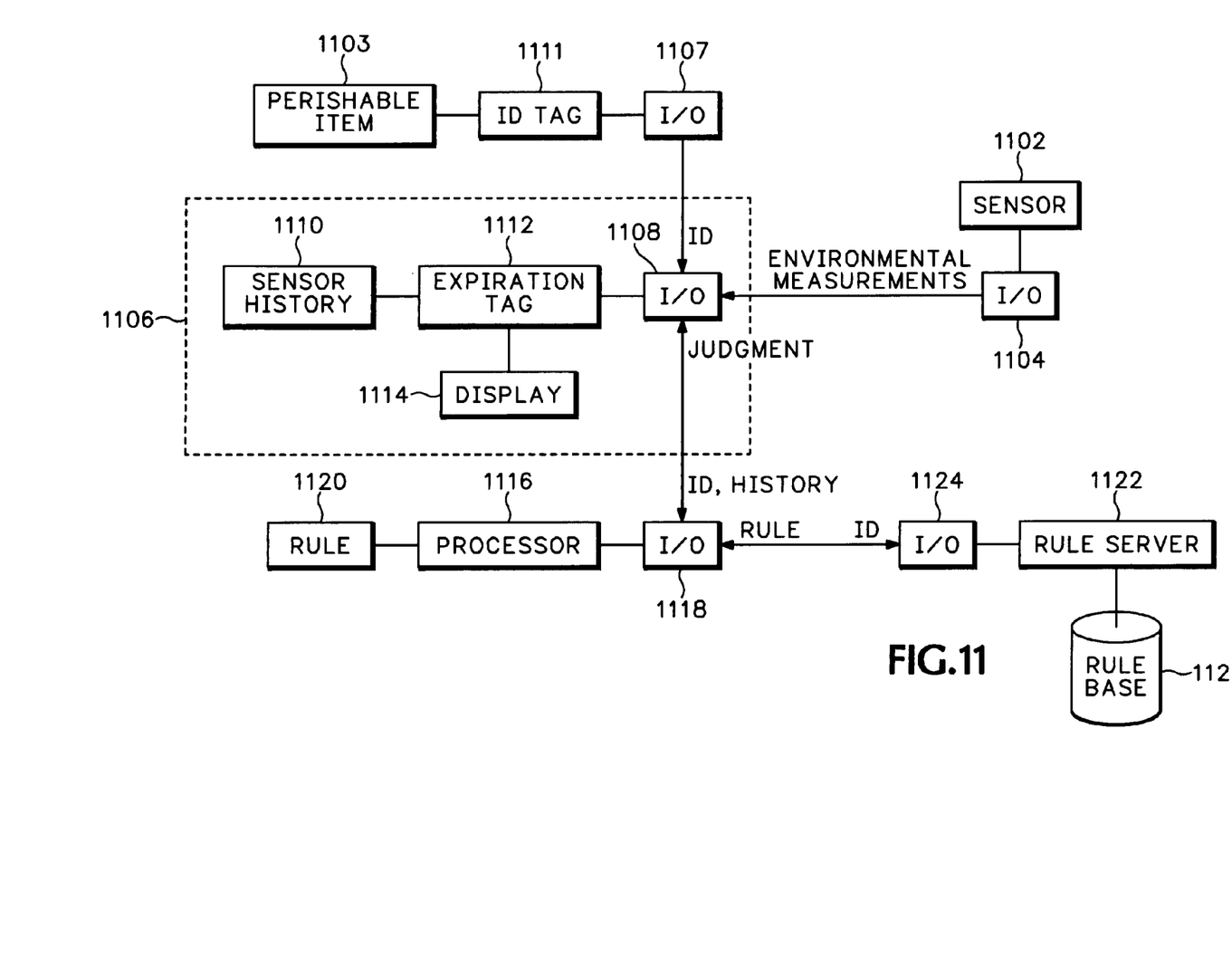
FIG. 11 is a schematic block diagram illustrative of a distributed system and process exemplary embodiment of the present invention.

Note that provision can be made for a computerized, known manner, upload of measurement data to external mass data storage (other than on-board memory 113, FIG. 1A); e.g., sensors mounted on wine casks can transmit to a remote central processing unit. FIG. 11 is an exemplary system and process generalization for a distributed system embodiment. The "Perishable Item" 1103 may be provided with an Identification Tag 1111, e.g., an RFID device similar to that shown in FIG. 7, 711, including a transmitting I/O port 1107. The "Perishable Item" 1103, or more pertinently a particular lot of perishables, may be simply sitting on a store shelf in a particular department. The monitor(s), "Sensor," 1102, also having a transmitting I/O port 1104, is in proximity to the perishable 1103, but, unlike FIG. 7, is not mounted directly on the perishable. For example, one Sensor 1102 may be sufficient for the whole shelf of items—see also, e.g., FIGS. 1 and 10. Another unit 1106, also having a transmitting I/O port 1108 maintains the "Sensor History" log(s) 1110, "Expiration Tag" sorting information 1112 for the lot on the shelf, and a "Display" 1114. A "Processor" 1116, similarly having a transmitting I/O port 1118 can use given particular rules, "Rule," 1120 as appropriate to each Sensor 1102 throughout the store. In order to be flexible, a separate "Rule Server" 1122, also having a transmitting I/O port 1124, maintains a "Rule Base" 1126 which may be maintained by a system administrator, e.g., a central goods distributor may be able to upgrade the rules for many products in the store. Communications in the distributed system and process with respect to the critical factors and characteristics as described hereinbefore between the various components described are represented by labeled arrows accordingly. Other distributions between stores, distributors, transportation vehicles, and other relevant parties may be implemented.

Figure 12:
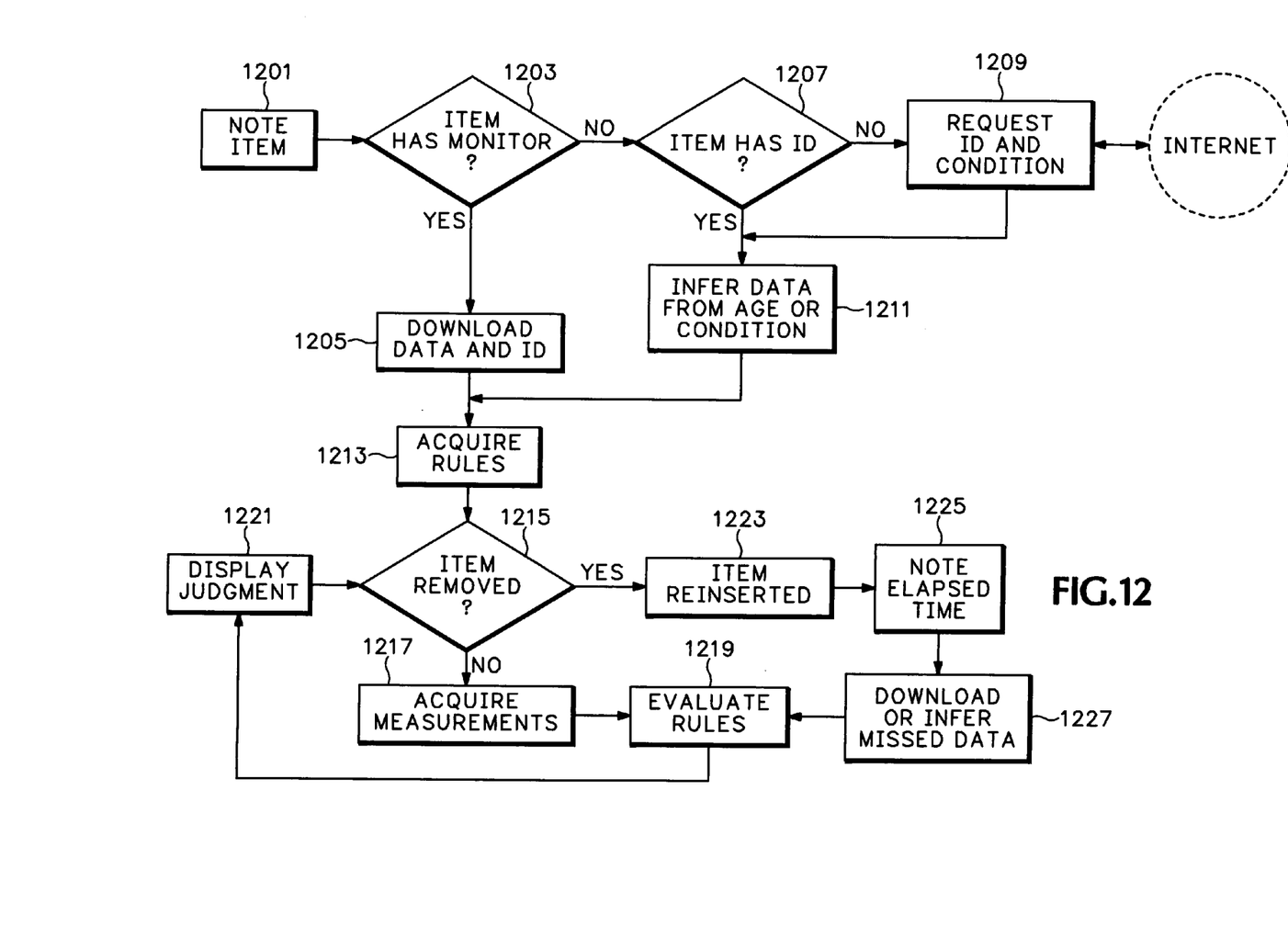
FIG. 12 is flow chart of an exemplary methodology in accordance with the present invention which relates to monitored containment chambers which have different contents over time.

FIG. 12 is a flow chart for an alternative exemplary embodiment pertaining to monitors attached to containment type implementations where different contents may be present overtime, e.g., refrigerators, refrigerated transportation vehicles, and the like. The first step, "Note Item," 1201 is to recognize the entry of a monitored item into the containment chamber (see e.g., FIG. 2, 201, FIG. 9, 900, or FIG. 10, 1001). Next, is to determine if the item itself has a monitor, "Item has Monitor?," 1203. If it does, 1203, Yes-path, data regarding its history and identification are downloaded, "Download Data and ID," 1205. If not, 1203, No-path, it is determined if the item has an identification device, "Item has ID?," 1207. If not, 1205, No-path, provision is made for requesting information, "Request ID and Condition," 1209 from another source, such as the user or consumer. If the Item has an identification device, 1207, Yes-path, or information is received 1209 from the remote source, inferences may be derived accordingly for current relevant data with respect to perishability, "Infer data from age or condition," 1211. The process paths converge once history and identification have been obtained in order to retrieve relevant rules, "Acquire Rules," 1213 for the current item of interest which has been received in the containment chamber. Rules can come from a database local to the monitoring system or requested over a network from a remote server from a manufacturer, distributor, or simply an agent who brokers such rules.

As long as the item remains in the chamber, "Item Removed" 1215, No-path, monitoring, "Acquire Measurements," 1217, applying the relevant rules, "Evaluate Rules," 1219, and displaying the results with respect to perishability, "Display Judgment," 1221, may be continuously executed or intermittently updated.

If the item is removed from the chamber, Item Removed, 1215, Yes-path, conditions for the item may have been monitored or not, depending what capabilities there are, if any, attached to the item itself. Once the item is returned to the chamber, "Item Reinserted," 1223, "Note Elapsed Time," 1225, either data for the elapsed period is downloaded from a self monitoring item—1203, Yes-path—or assumptions are inferred, "Download or Infer Missed Data," 1227. A typical example of a reasonable assumption would be that a bottle of wine removed from a monitoring case was at room temperature for the elapsed time period. The rules are re-applied 1219 and the display is updated 1221.

Thus, it has been shown via several exemplary embodiments that a prediction itself might be a definitive judgment that the monitored item is in an expired condition, that a specific amount of time until a critical condition exists, that a most probable of a fixed set of time periods—e.g., in a day, a week, two weeks, a month, etc., or a range of expiration dates—e.g., between three and five days—is reasonable, or that a probability distribution related to the future (see also, FIG. 4, element 405) or predictable expiration is calculable.

In accordance with known manner statistical analysis methods, the prediction might be tunable by a desired degree of confidence.

It should also be recognized that for certain implementations the prediction can be generalized to a notion of a "maturity date." That is, some items are best used after a certain period of time has elapsed, e.g., wine (see also FIGS. 2 and 4 and detailed description, supra), cheese, fruit, and the like. Thus, a specific monitored item may have one or more predicted maturity dates as well as expiration dates. FIG. 8 is also exemplary of a prediction wherein the dates may have to do with different aspects of the perishable, such a ripeness, sweetness, firmness, potency, sharpness, and even safety for consumption, e.g., foods such as meat products which spoil. Monitored items which are not comestibles but which nonetheless have a limited life, e.g., batteries, fuel cells, fire extinguishers, certain fuels, and the like, may have an alternative notion of "remaining potency" associated with the displayed information.

It should be recognized that implementations can be devised to be retrofit to existing storage units.

The foregoing description of exemplary embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. The described exemplary embodiments and implementations are not considered to be all inclusive as it will be recognized by those skilled in the art that there are a vast variety of product dependent characteristics, changes in those characteristics, and level of interest dependent upon the specific product with which the present invention is associated and can even be tailored to a specific consumer's level of interest(s); no limitation on the scope of the invention is intended nor should any be implied therefrom. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims.

What is claimed is:

1. A method for providing data representative of at least one characteristic relevant to viability of a product, the method comprising:

monitoring and storing data associated with at least one characteristic associated with viability of said product;

analyzing, by a processor, the data associated with said at least one characteristic;

based on said analyzing, the processor predicting at least one dynamically alterable future viability state condition of said product related to said data associated with said at least one characteristic; and displaying at least one indicator related to said at least one dynamically alterable future viability state condition, wherein said at least one indicator is in the form of a future date that is adjusted based on the analyzing.

2. The method as set forth in claim 1 wherein said at least one characteristic associated with the at least one dynamically alterable future viability state condition is related to probability of degradation of the product.

3. The method as set forth in claim 1 wherein said at least one characteristic associated with the at least one dynamically alterable future viability state condition is related to product maturity.

4. The method as set forth in claim 1 wherein said at least one characteristic associated with the at least one dynamically alterable future viability state condition is related to remaining potency of the product.

5. The method of claim 1, further comprising displaying a time-based history of measurements relating to the at least one characteristic.

6. The method of claim 1, wherein the analyzing is performed by the processor on board a monitoring device, and the method further comprising selecting at least one rule from a data set of rules stored in one of(1) a memory on board the monitoring device, and (2) a remote location, wherein analyzing the data associated with said at least one characteristic comprises applying the at least one rule to the data associated with said at least one characteristic.

7. The method of claim 1, further comprising classifying the product based on identifying the product by performing one of bar code reading, magnetic stripe reading, RFID reading, and optical character recognition, the method further comprising selecting at least one rule from a data set of rules based on the classifying, wherein analyzing the data associated with said at least one characteristic comprises applying the at least one rule to the data associated with said at least one characteristic.

8. The method of claim 1, wherein the monitoring, storing, and analyzing are performed by a first monitoring device associated with a container that stores the product along with other products, the method further comprising transmitting the data associated with the at least one characteristic from the first monitoring device to an individual monitoring device associated with each of the products.

9. A product package comprising:

a containment for a product having viability factors;

affixed to said containment, a product viability-related conditions monitoring device;

an analysis device for receiving, for storing, and for analyzing measurement data from said monitoring device and for generating data representative of a current condition of the product and a dynamically alterable predicted date relating to one of the viability factors of the product stored within said containment; and a display to display the data representative of the current condition and the dynamically alterable predicted date relating to the one viability factor.

10. The product package of claim 9, further comprising a control panel to enable a user to change the display.

11. The product package of claim 9, wherein the dynamically alterable predicted date relating to the one of the viability factors comprises the dynamically alterable predicted date regarding a maturity of the product.

12. A monitoring system for monitoring a product having at least one viability characteristic, the system comprising:

a resealable containment for holding said product;

a data collection device to measure parameters related to viability of said product; and a parameters analysis device for retrieving at least one rule from a data set of rules and to apply the at least one rule to the measured parameters from said data collection device and for adjusting a dynamically alterable critical date relating to the product according to applying the at least one rule to the measured parameters, wherein the dynamically alterable critical date comprises one of a dynamically alterable maturity date and a dynamically alterable expiration date.

13. The monitoring system as set forth in claim 12 wherein said data collection device is configured for attachment to said resealable containment.

14. The monitoring system as set forth in claim 12 further comprising:

a display integrated with an environmental control chamber, wherein said data collection device is releasably connected to said display.

15. The monitoring system as set forth in claim 12 wherein said data collection device is resettable.

16. The monitoring system of claim 12, further comprising a display to display the dynamically alterable critical date and to display historical measurement data.

17. The system of claim 12, the parameters analysis device to classify the product based on identification of the product according to performing one of bar code reading, magnetic stripe reading, RFID reading, and optical character recognition, and wherein the at least one rule is selected based on the classifying.

18. Apparatus for predicting and displaying critical time-related information for a product having at least one viability factor, the apparatus comprising:

associated with the product, means for obtaining measurements pertinent to viability;

based on the measurements pertinent to viability, means for calculating at least one dynamically alterable time-related characteristic for the product, wherein the at least one dynamically alterable time-related characteristic comprises at least one of a predicted maturity date and a predicted expiration date; and associated with the means for calculating, means for displaying said at least one of the predicted maturity date and predicted expiration date.

19. The apparatus as set forth in claim 18 further comprising:

means for establishing a remote telecommunications link between said means for obtaining and said means for calculating.

20. The apparatus as set forth in claim 18 further comprising:

associated with said means for calculating, means for providing rules related to calculating the at least one dynamically alterable time-related characteristic for the product.

21. The apparatus as set forth in claim 18 wherein said at least one dynamically alterable time-related characteristic is further based upon a recorded history of handling and environmental conditions which substantively affect the product.

22. The apparatus as set forth in claim 18 further comprising:

means for calculating and displaying both current status estimates and measurement histories of said product.

23. An apparatus for predicting and displaying critical time-related information for a product having at least one viability factor, the apparatus comprising:

associated with the product, means for obtaining measurements pertinent to viability;

associated with the means for obtaining measurements pertinent to viability, means for calculating at least one time-related characteristic for the product;

associated with the means for calculating, means for displaying said at least one time-related characteristic; and means for transmitting data related to said at least one viability factor from a first means for calculating a time frame related to critical condition data of the product associated with a first containment to a second means for calculating a time frame related to critical condition data of the product associated with a second containment for said product.

24. A system for providing a dynamic critical date for a product having at least one viability factor, the system comprising:

at least one monitoring device wherein at least one specific critical condition factor associated with maturation and degradation of the product is monitored;

at least one storing device wherein data related to said maturation and degradation is stored;

associated with said at least one monitoring device and said at least one storing device, at least one data processing device to analyze said data related to said maturation and degradation and to adjust the dynamic critical date according to the data related to said maturation and degradation, the dynamic critical date comprising at least one of a maturity date and an expiration date; and associated with said at least one data processing device, at least one displaying device wherein said dynamic critical date is displayed, wherein said at least one data processing device retrieves a selected at least one rule from a data set of rules stored at a remote storage location, and wherein said at least one data processing device applies the at least one rule to the data related to said maturation and degradation.

25. The system as set forth in claim 24 further comprising:

associated with the at least one data processing device and the at least one monitoring device, at least one telecommunications device for the at least one data processing device to receive the data related to said maturation and degradation from the at least one monitoring device.

26. A method for predicting and displaying information regarding viability of an item, the method comprising:

storing a time-based history of environmental data and handling data of the item;

substantially continuously compiling, by a processor, the time-based history;

based on the time-based history and at least one rule associated with viability of the item, substantially continuously calculating, by the processor, at least one dynamically alterable critical date associated with the viability, the at least one dynamically alterable critical date comprising at least one of a maturity date and an expiration date; and substantially continuously displaying said at least one dynamically alterable critical date.

* * * * *